US012100914B2

(12) United States Patent
Otsuta et al.

(10) Patent No.: US 12,100,914 B2
(45) Date of Patent: Sep. 24, 2024

(54) SHIELDING MEMBER WITH A PROTRUDING PORTION PREVENTING ERRONEOUS ASSEMBLY TO SHIELDING SHELL

(71) Applicant: Yazaki Corporation, Tokyo (JP)

(72) Inventors: Yasuhiro Otsuta, Makinohara (JP); Masato Taira, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 337 days.

(21) Appl. No.: 17/850,075

(22) Filed: Jun. 27, 2022

(65) Prior Publication Data

US 2022/0416479 A1 Dec. 29, 2022

(30) Foreign Application Priority Data

Jun. 28, 2021 (JP) ................................ 2021-106999

(51) Int. Cl.
*H01R 13/6593* (2011.01)

(52) U.S. Cl.
CPC ................................ *H01R 13/6593* (2013.01)

(58) Field of Classification Search
CPC .............. H01R 13/6593; H01R 13/748; H01R 2201/26; H01R 13/6589; H01R 13/648; H01R 13/502
See application file for complete search history.

(56) References Cited

U.S. PATENT DOCUMENTS

2022/0173550 A1* 6/2022 Liu ...................... H01R 13/424
2023/0027106 A1* 1/2023 Masuda ............ H01R 13/6592
2024/0136745 A1* 4/2024 Lee ........................ H01R 12/75

FOREIGN PATENT DOCUMENTS

CN 105765811 A * 7/2016 ......... H01R 13/6581
JP 2005129391 A * 5/2005 ............... H01R 4/64
JP 2020-87582 A 6/2020

* cited by examiner

*Primary Examiner* — Travis S Chambers
(74) *Attorney, Agent, or Firm* — Sughrue Mion, PLLC

(57) ABSTRACT

A shielding member attached to a shielding shell. The shielding member includes a first and a second plate portion. The second plate portion includes a first and second ends, a fastening hole at both ends and a protruding portion on the first end. The protruding portion is longer than a length of the second plate portion. When a plurality of shielding members are attached to the shielding shell, the first end with the protruding portion is overlapped with the other first end of the adjacent shielding member so that it is located on the outside. When the first end is overlapped with the other end of the adjacent shielding member so that it is located on the inside, the protruding portion interferes with the first plate portion of the adjacent shielding member. In this way, the shielding member having the configuration can prevent erroneous assembly to the shielding shell.

3 Claims, 6 Drawing Sheets

SHIELDING MEMBER WITH A PROTRUDING PORTION PREVENTING ERRONEOUS ASSEMBLY TO SHIELDING SHELL

CROSS-REFERENCE TO RELATED APPLICATION

The present application claims priority to Japanese Patent Application No. 2021-106999 filed on Jun. 28, 2021, the entire content of which is incorporated herein by reference.

TECHNICAL FIELD

The presently disclosed subject matter relates to a shielding member and a shielded connector.

BACKGROUND

A shielded connector of related art includes a terminal-equipped electric wire whose terminal is connected to an end portion of an electric wire, an electric wire insertion port through which the electric wire is inserted, a braid sheathed on the electric wire, and a shielding shell that is attached to a housing or the like having the electric wire insertion port and is conductively connected to the braid. For example, a shielded connector of one related art includes a pair of electric wires, a braided conductor sheathed on the pair of electric wires, an electric wire insertion hole which is provided in a housing and into which the pair of electric wires are inserted, and a shielding shell attached to the housing (for example, refer to JP2020-087582A). In the shielded connector, the braided conductor is sheathed to collectively cover the pair of electric wires so as to include the electric wire insertion hole, and is conductively connected to the shielding shell.

In general, when a braid is sheathed on a plurality of electric wires, the braid is sheathed to collectively cover the plurality of electric wires as in the shielded connector of the related art. However, in consideration of shielding performance, it may be preferable to sheathe each electric wire with a braid. In this way, when the braid is sheathed on each electric wire, from a viewpoint of workability, it is preferable that one electric wire insertion port (electric wire insertion hole) is formed for one electric wire, and that the electric wire insertion port is formed separately from the housing.

When the electric wire insertion port is configured as described above, for example, a member provided with the electric wire insertion port (hereinafter, also referred to as "electric wire pull-out member") is attached to the shielding shell, whereby the braid and the shielding shell are easily conductively connected. In the configuration, simply assembling the electric wire pull-out member and the shielding shell leads to an increase in a size of the shielded connector. Therefore, by assembling adjacent electric wire pull-out members to the shielding shell in an overlapped manner, it is possible to suppress an increase in the size of the shielded connector, and thus it is possible to reduce the size of the shielded connector. As an example, when the electric wire pull-out member and the shielding shell are fastened by the fastening member, fastening holes of the adjacent electric wire pull-out members are overlapped with each other, so that the adjacent electric wire pull-out members are fastened together to the shielding shell.

From a viewpoint of reducing the size of the shielded connector, it is preferable that overlapping portions of both of the adjacent electric wire pull-out members are offset from each other, and the shielded connector can be reduced in size in an overlapping direction of the electric wire pull-out members by being configured in this manner. For example, when the adjacent electric wire pull-out members are overlapped in an upper-lower direction, a portion located on a lower side may be offset (so-called sank) downward, or a portion located on an upper side may be offset (so-called floated) upward.

However, when an order of assembling (that is, overlapping) the electric wire pull-out members to the shielding shell is incorrect, a position of the overlapping portion is different from an original position. In the state, when the electric wire pull-out member and the shielding shell are fastened by the fastening member or the like, deformation of the overlapping portion or loosening of fixing by the fastening member or the like occurs.

SUMMARY

Illustrative aspects of the presently disclosed subject matter provide a shielding member and a shielded connector that can prevent erroneous assembly of a shielding member to a shielding shell.

According to an illustrative aspect of the presently disclosed subject matter, a shielding member is configured to be attached to a shielding shell by a fastening member. The shielding member includes a first plate portion provided with an electric wire insertion port protruding in a first direction and a second plate portion formed by bending an end portion of the first plate portion toward a second direction opposite to the first direction. The second plate portion includes a first end and a second end along an intersecting direction intersecting the first and second directions, a fastening hole provided at each of the first and second ends and through which the fastening member is configured to be inserted and a protruding portion provided on the first end and protruding toward the first direction. The second plate portion is configured such that the first and second ends deviate from each other in a plate thickness direction of the second plate portion. A length of the protruding portion along the first and second directions is longer than a length of the second plate portion along the first and second directions.

Other aspects and advantages of the presently disclosed subject matter will be apparent from the following description, the drawings and the claims.

DESCRIPTION OF EMBODIMENTS

Hereinafter, an electric wire shielding member 3 and a shielded connector 1 according to an embodiment of the presently disclosed subject matter will be described with reference to the drawings. The electric wire shielding member 3 corresponds to a "shielding member" of the presently disclosed subject matter.

Hereinafter, for convenience of description, as shown in FIGS. 1 to 6, a "front-rear direction", an "upper-lower direction", a "left-right direction", "front", "rear", "upper", "lower", "left", and "right" are defined. The "front-rear direction", the "upper-lower direction", and the "left-right direction" are orthogonal to each other. The front-rear direction corresponds to a "predetermined direction" of the presently disclosed subject matter. A rear side in the front-rear direction corresponds to a "protruding side of an electric wire insertion port 25" of the presently disclosed subject matter, and a front side in the front-rear direction corresponds to a "side opposite to the protruding side of the electric wire insertion opening 25" of the presently disclosed subject matter. The upper-lower direction corresponds to a "plate thickness direction of a second plate portion 22" of the presently disclosed subject matter. The left-right direction corresponds to an "intersecting direction" of the presently disclosed subject matter. In the present embodiment, a left side corresponds to "one side" of the presently disclosed subject matter, and a right side corresponds to "the other side" of the presently disclosed subject matter.

Figure 1:
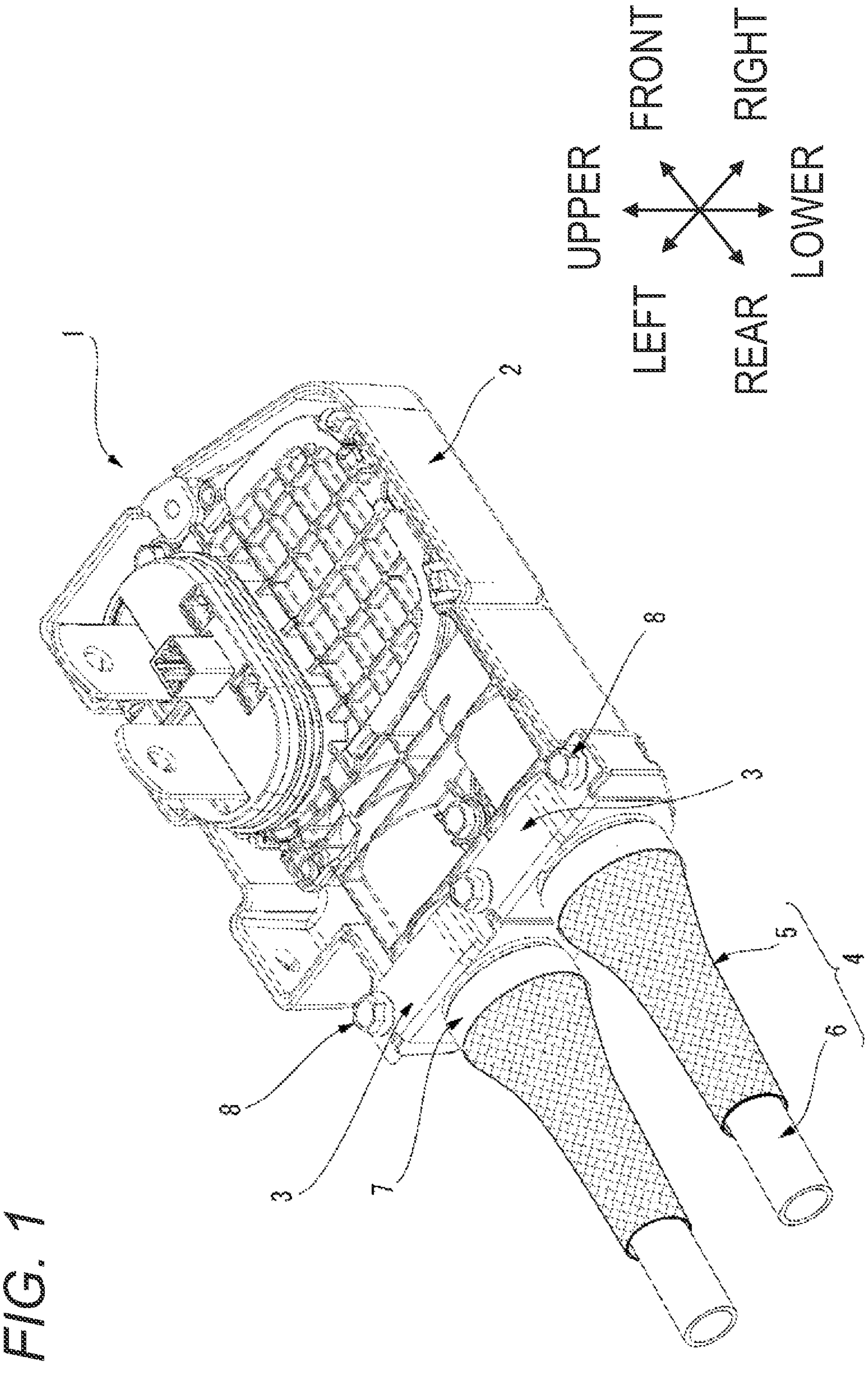
FIG. 1 is a perspective view of a shielded connector according to an embodiment of the presently disclosed subject matter.

As shown in FIG. 1, a shielded connector 1 includes a shielding shell 2 that accommodates electronic components and the like inside, a pair of electric wire shielding members 3 attached to the shielding shell 2, and a pair of shielded wires 4.

The pair of shielded wires 4 include a pair of terminal-equipped electric wires 6 that are inserted through electric wire insertion ports 25 of the electric wire shielding members 3, and a pair of braids 5 that are sheathed on electric wires **6*b* of the terminal-equipped electric wires 6 and are conductively connected to the shielding shell 2 via the electric wire shielding members 3. Each of the terminal-equipped electric wires 6 includes an electric wire 6*b* and a terminal portion 6*a*** that is conductively connected to a front end portion of the electric wire.

Figure 2:
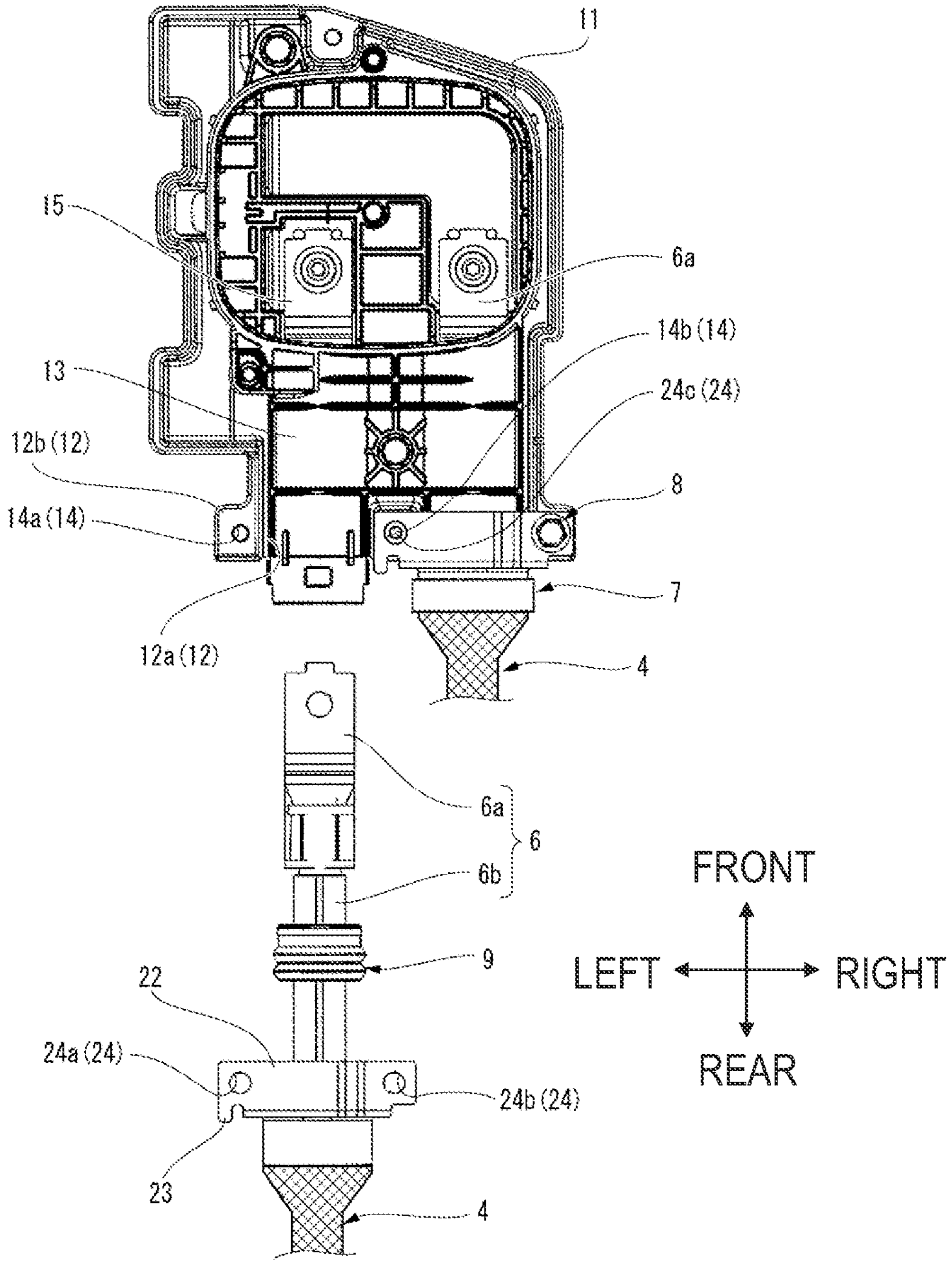
FIG. 2 illustrates erroneous assembly of the shielded connector, and is a front view before an electric wire shielding member and a shielded wire are attached to a shielding shell.
Figure 3:
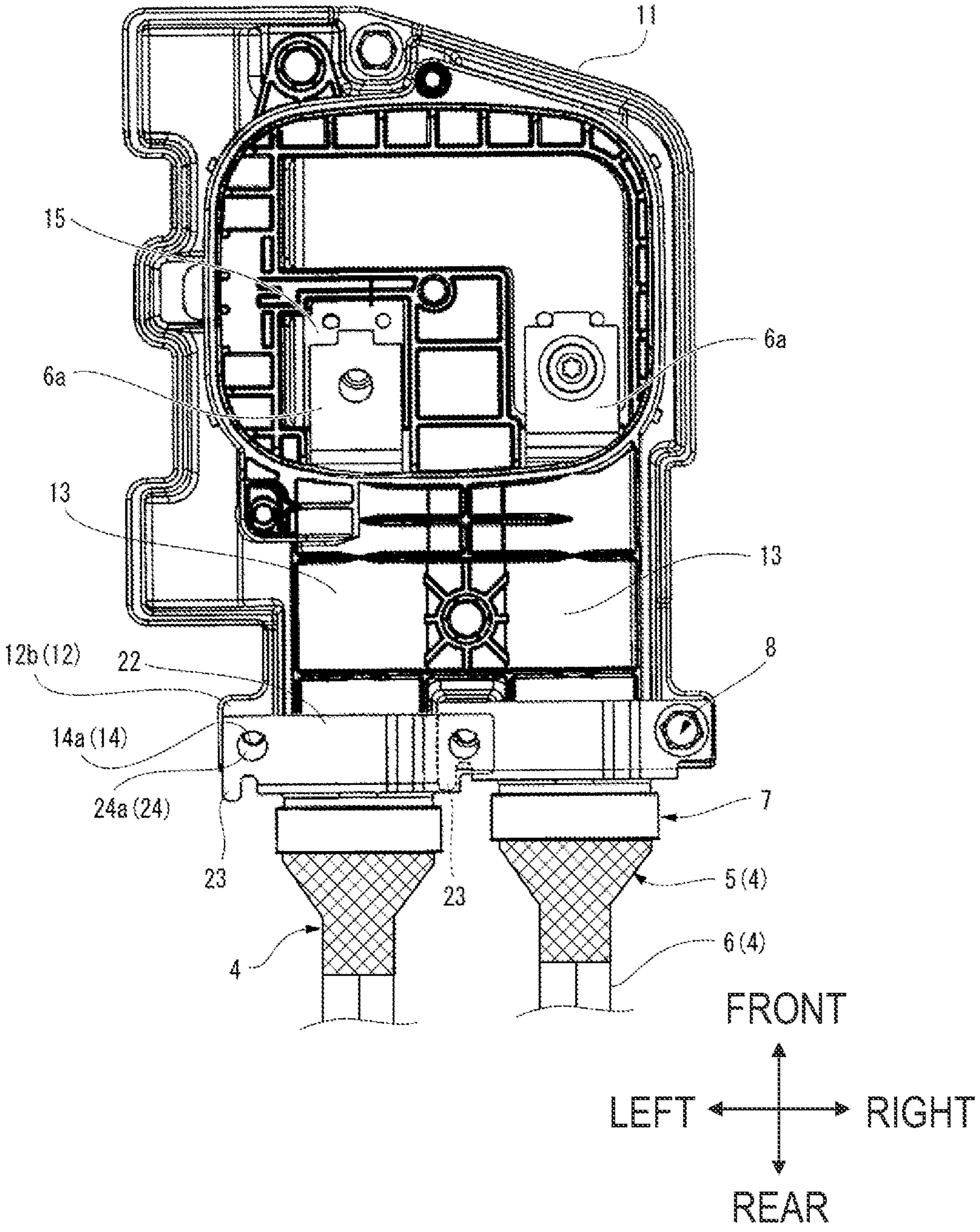
FIG. 3 illustrates erroneous assembly of the shielded connector, and is a front view in the middle of assembling the electric wire shielding member and the shielded wire to the shielding shell.

First, the shielding shell 2 will be described. The shielding shell 2 is made of a conductive material, and the braids 5 of the shielded wires 4 are grounded via the electric wire shielding members 3. As shown in FIGS. 1 to 3 (particularly, FIG. 2), the shielding shell 2 has a casing 11 that accommodates electronic components and the like inside.

The casing 11 has a box shape including a bottom wall located on a lower side in the upper-lower direction and a peripheral wall erected from the bottom wall, and is opened on an upper side. A pair of attached portions 12 to which the electric wire shielding members 3 are attached are provided at a rear end portion of the casing 11.

Each of the attached portion 12 includes a notch portion **12*a* formed by cutting out a rear peripheral wall of the casing 11 to open to the rear side, and a placement portion 12*b* having an upper end surface located substantially on the same plane as an opening surface of the casing 11. The placement portion 12*b* is located at rear end portions of a left peripheral wall and a right peripheral wall and between a pair of notch portions 12*a*. A fastening hole 14 recessed downward along the upper-lower direction is provided in an upper end surface of the placement portion 12*b*. As will be described later, in the shielding shell 2, a fastening member 8 is inserted into the fastening hole 14 of the attached portion 12 and a fastening hole 24 of the electric wire shielding member 3, and the shielding shell 2 and the shielding member 3** are fastened and fixed.

The shielding shell 2 has a pair of electric wire accommodating portions 13 and a pair of terminal connection portions 15 inside the casing 11. Each of the electric wire accommodating portion 13 accommodates a front portion of the electric wire **6*b* of the terminal-equipped electric wire 6 inserted through the electric wire shielding member 3. The terminal portion 6*a* of the terminal-equipped electric wire 6 is fastened and fixed to and conductively connected to the terminal connection portion 15. The shielding shell 2** has been described above.

Next, the electric wire shielding member 3 will be described. The electric wire shielding member 3 is made of a conductive material, is attached to the shielding shell 2, and is conductively connected to the shielding shell 2 and the braid 5.

Figure 5A:
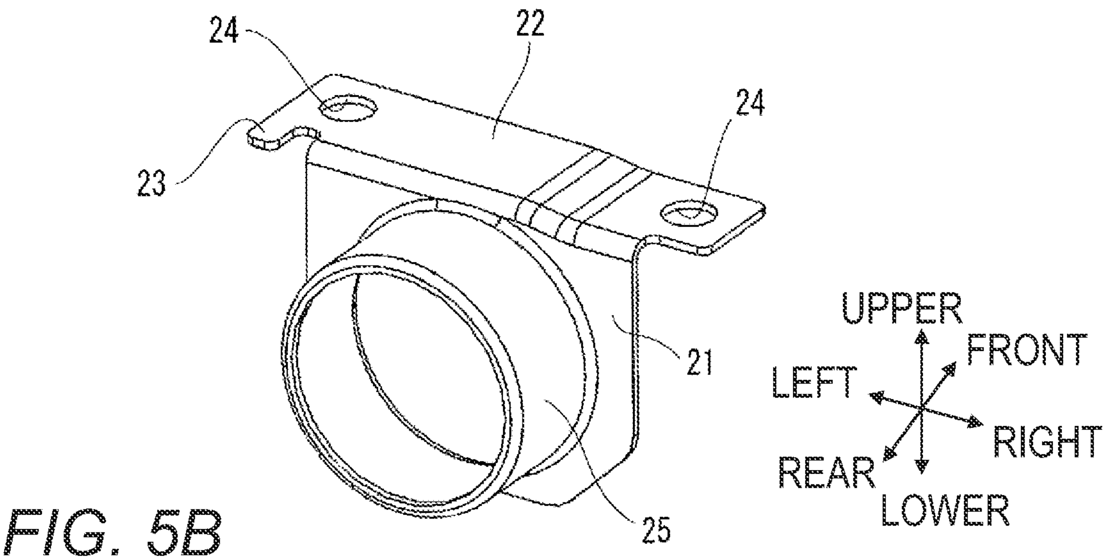
FIG. 5 is a perspective view of the electric wire shielding member according to the embodiment of the presently disclosed subject matter.
FIG. 5B is a front view of FIG. 5A as viewed from a rear.
FIG. 5C is a front view of FIG. 5A as viewed from above.
Figure 5B:
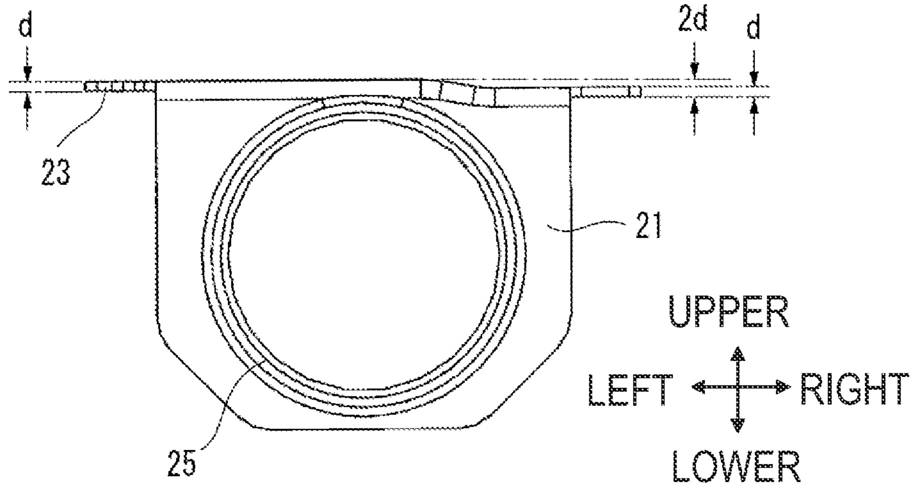
Figure 5C:
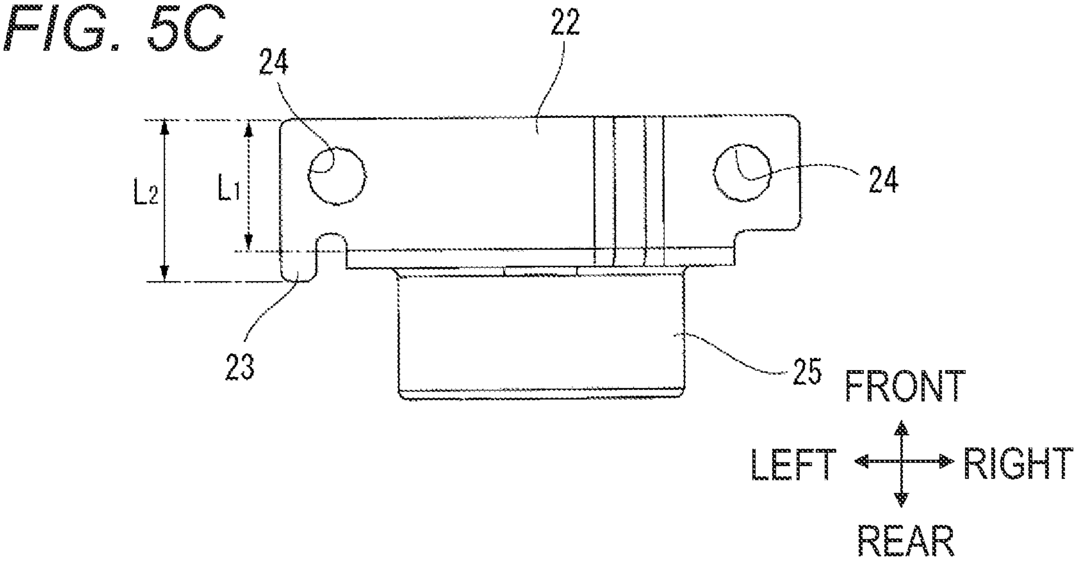

As shown in FIGS. 5A to 5C, the electric wire shielding member 3 includes a first plate portion 21 having the electric wire insertion port 25, and a second plate portion 22 formed by bending an upper end portion of the first plate portion 21 toward the front side in the front-rear direction.

When the electric wire shielding member 3 is attached to the shielding shell 2, the first plate portion 21 is positioned so as to correspond to the notch portion **12*a* of the attached portion 12. In other words, the electric wire shielding member 3 is attached such that the first plate portion 21 closes an opening (that is, notch portion 12*a*) on a rear side of the casing 11 of the shielding shell 2**.

The electric wire insertion port 25 provided in the first plate portion 21 protrudes rearward (first direction) from a rear end surface of the first plate portion 21. The electric wire insertion port 25 has a substantially cylindrical shape, and the terminal-equipped electric wire 6 is inserted therethrough as described above. As will be described later, the braid 5 sheathed on the electric wire **6*b* is attached to an outer periphery of the electric wire insertion port 25**.

As described above, the second plate portion 22 is formed by bending the upper end portion of the first plate portion 21 toward the front side (second direction) in the front-rear direction. The second plate portion 22 is provided with fastening holes 24 at both end portions in the left-right direction.

In particular, as shown in FIG. 5B, a left end portion (first end) and a tight end portion (second end) of the second plate portion 22 deviate (are offset) from each other in the upper-lower direction. Specifically, the right end portion and the left end portion of the second plate portion 22 are displaced in the upper-lower direction by a plate thickness (length d) of the second plate portion 22. In other words, the right end portion of the second plate portion 22 is located lower than the left end portion by the length d.

A protruding portion 23 that protrudes rearward along the front-rear direction is provided at the left end portion of the second plate portion 22. Specifically, the protruding portion 23 is provided on the one (left end portion in the example) located on the upper side of the left end portion and the right end portion of the second plate portion 22 that are offset in the upper-lower direction. The protruding portion 23 is formed such that a length L2 in the front-rear direction is longer than a length L1 in the front-rear direction of the second plate portion 22. The electric wire shielding member 3 has been described above.

Next, a method for assembling the shielding shell 2 and the electric wire shielding member 3 will be described. First, an aspect of the electric wire shielding member 3 before being attached to the shielding shell 2 will be described with reference to FIG. 2. FIG. 2 illustrates erroneous assembly of the shielding shell 2 and the electric wire shielding member 3, but the aspect of the wire shielding member 3 is the same.

In the following description, it is assumed that the second plate portion 22 of the electric wire shielding member 3 to be attached later is overlapped on an upper side of the second plate portion 22 of the electric wire shielding member 3 attached earlier. For this reason, when the second plate portion 22 of the electric wire shielding member 3 to be attached later is overlapped on a lower side of the second plate portion 22 of the electric wire shielding member 3 attached earlier, the following is not restrictive.

As shown in FIG. 2, the terminal-equipped electric wire 6 of the shielded wire 4 is inserted through the electric wire insertion port 25 of the electric wire shielding member 3 in the front-rear direction. A packing 9 is attached to a portion of the electric wire 6*b* on a front side of the electric wire insertion port 25. When the electric wire shielding member 3 is attached to the shielding shell 2, the packing 9 is located in the electric wire accommodating portion 13 and stops water between the electric wire accommodating portion 13 and the electric wire 6*b* accommodated in the electric wire accommodating portion 13.

The braid 5 is sheathed at a position on a rear side of the electric wire insertion port 25 of the electric wire 6*b*. A front end portion of the braid 5 sheathed on the electric wire 6*b* is also attached to the electric wire insertion port 25 so as to cover an outer peripheral surface of the electric wire insertion port 25. Accordingly, the braid 5 and the electric wire insertion port 25 (that is, the electric wire shielding member 3) are conductively connected.

A shield ring 7 is attached (for example, crimped) to a portion of the braid 5 that is attached to the electric wire insertion port 25. The portion to which the shield ring 7 is attached is arranged outward in a radial direction of the electric wire insertion port 25 in an order of the electric wire insertion port 25, the braid 5, and the shield ring 7.

The electric wire shielding member 3 including the shielded wire 4 is attached to the shielding shell 2 along the front-rear direction. Since the right end portion of the second plate portion 22 is located lower than the left end portion as described above, the left end portion of the second plate portion 22 of one electric wire shielding member 3 needs to be overlapped on the upper side of the right end portion of the second plate portion 22 of the adjacent electric wire shielding member 3. Therefore, in the example, the electric wire shielding member 3 is attached to the shielding shell 2 in order from the left side.

The electric wire shielding member 3 on the left side is moved toward a predetermined position where the electric wire shielding member 3 on the left side is attached to the shielding shell 2. When the electric wire shielding member 3 on the left side is arranged at the predetermined position, the fastening member 8 is inserted through the fastening hole 24*a* and the fastening hole 14*a* of the shielding shell 2, and a left end portion of the electric wire shielding member 3 on the left side is fastened and fixed to the shielding shell 2 (specifically, placement portion 12*b*).

The electric wire shielding member 3 on the right side is moved toward a predetermined position where the electric wire shielding member 3 on the right side is attached to the shielding shell 2. When the electric wire shielding member 3 on the right side is arranged at the predetermined position, a left end portion of the electric wire shielding member 3 on the right side is overlapped on an upper side of a right end portion of the electric wire shielding member 3 on the left side. At this time, the fastening hole 24*b* of the electric wire shielding member 3 on the left side, the fastening hole 24*c* of the electric wire shielding member 3 on the right side, and the fastening hole 14 of the shielding shell 2 communicate with each other in the upper-lower direction so that the fastening member 8 can be inserted therethrough. That is, the fastening member 8 is inserted through the fastening hole 24*b*, the fastening hole 24*c*, and the fastening hole 14*b*, and the electric wire shielding members 3 on the right and left sides are fastened together to the shielding shell 2.

Thereafter, the fastening member 8 is inserted through the fastening hole 24 on the right side of the electric wire shielding member 3 on the right side and the fastening hole 14 on the right side of the shielding shell 2. In this way, a plurality of (in the example, a pair of) electric wire shielding members 3 are attached (that is, fastened and fixed) to the shielding shell 2. The method for assembling the shielding shell 2 and the electric wire shielding member 3 has been described above.

Next, a structure for preventing erroneous assembly of the electric wire shielding member 3 to the shielding shell 2 will be described. As described above, in the shielded connector 1 according to the present embodiment, the electric wire shielding member 3 is attached to the shielding shell 2 in order from the left side. However, when the electric wire shielding member 3 is attached to the shielding shell 2, there is a possibility that the electric wire shielding member 3 is erroneously attached from the right side.

In a case where overlapping portions are offset in order to fasten the adjacent electric wire shielding members together as in the present embodiment, when the overlapping portions are fastened together in a state where an overlapping order is incorrect (for example, a state where the electric wire shielding member that is offset to be located on the upper side is arranged on the lower side, or the like), there is a concern that deformation of a component, loosening of a fastening member, or the like may occur. The reason why the erroneous assembly is prevented is to prevent the above problem from occurring.

In the following description, it is assumed that the second plate portion 22 of the electric wire shielding member 3 to be attached later is overlapped on the upper side of the second plate portion 22 of the electric wire shielding member 3 attached earlier. For this reason, when the second plate portion 22 of the electric wire shielding member 3 to be attached later is overlapped on the lower side of the second plate portion 22 of the electric wire shielding member 3 attached earlier, the following is not restrictive.

Figure 4:
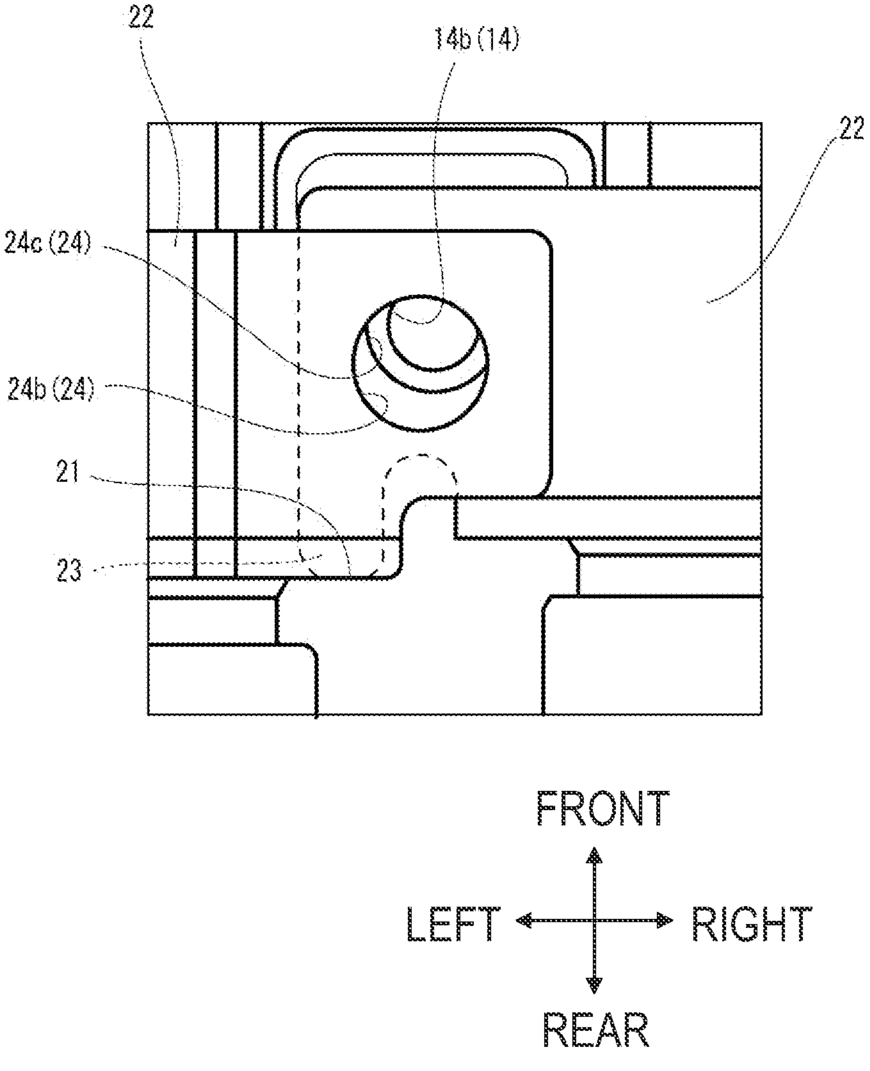
FIG. 4 is an enlarged view of a main part of FIG. 3.

As shown in FIGS. 2 to 4, the shielded connector 1 of the present embodiment is configured such that the electric wire shielding member 3 on the left side is not attached to the shielding shell 2 when the electric wire shielding member 3 on the right side is attached first and then the electric wire shielding member 3 on the left side is attached.

Specifically, when the electric wire shielding member 3 on the left side is attached after the electric wire shielding member 3 on the right side is attached, the right end portion of the electric wire shielding member 3 on the left side is overlapped on the upper side of the left end portion of the electric wire shielding member 3 on the right side. At this time, the protruding portion 23 of the electric wire shielding member 3 on the right side abuts against a rear-end surface of the first plate portion 21 of the electric wire shielding member 3 on the left side (particularly, see FIG. 4).

Therefore, even if the electric wire shielding member 3 on the left side is to be arranged at a predetermined position, the protruding portion 23 of the electric wire shielding member 3 on the right side interferes with the first plate portion 21 of the electric wire shielding member 3 on the left side, and thus the electric wire shielding member 3 on the left side cannot be arranged at a predetermined position where the electric wire shielding member 3 on the left side is attached to the shielding shell 2. That is, the fastening member 8 cannot be inserted through the fastening hole 24*b*, the fastening hole 24*c*, and the fastening hole 14*b*. Accordingly, the erroneous assembly of the electric wire shielding member 3 to the shielding shell 2 is prevented. The structure for preventing erroneous assembly of the electric wire shielding member 3 to the shielding shell 2 has been described above.

In the electric wire shielding member 3 according to the present embodiment, since the left end portion and the right end portion of the second plate portion 22 are offset in the upper-lower direction, the right end portion of the second plate portion 22 of one electric wire shielding member 3 can be overlapped with the left end portion of the second plate portion 22 of the other adjacent electric wire shielding member 3, and an increase in the size of the shielded connector 1 in the upper-lower direction can be prevented.

In the shielded connector 1 according to the present embodiment, since the second plate portion 22 of the electric wire shielding member 3 is provided with the protruding portion 23, the protruding portion 23 interferes with the first plate portion 21 of the adjacent electric wire shielding member 3. That is, even if a plurality of electric wire shielding members 3 are to be attached to the shielding shell 2 in an incorrect order (that is, even if a plurality of second plate portions 22 are to be overlapped in an incorrect order), the electric wire shielding members 3 cannot be attached to the shielding shell 2. Accordingly, in the shielded connector 1, the erroneous assembly of the electric wire shielding member 3 to the shielding shell 2 is prevented.

While the presently disclosed subject matter has been described with reference to certain exemplary embodiments thereof, the scope of the presently disclosed subject matter is not limited to the exemplary embodiments described above, and it will be understood by those skilled in the art that various changes and modifications may be made therein without departing from the scope of the presently disclosed subject matter as defined by the appended claims.

Figure 6:
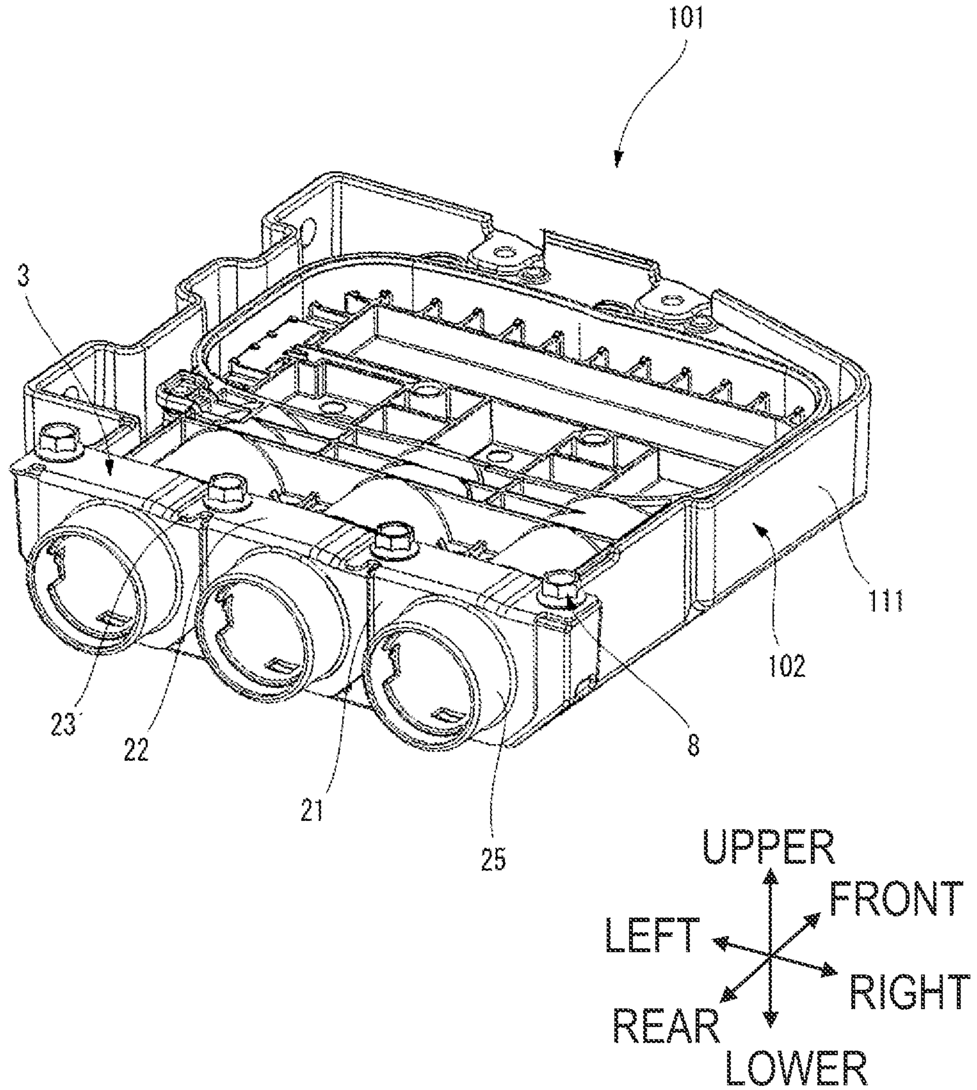
FIG. 6 is a perspective view of a shielded connector according to another embodiment.

In the shielded connector 1 according to the present embodiment, the pair of electric wire shielding members 3 are attached to the shielding shell 2, but as shown in FIG. 6, three electric wire shielding members 3 may be attached to the shielding shell 2. In a shielded connector 101 shown in FIG. 6, three attached portions are provided in a casing 111 of a shielding shell 102.

According to an aspect of the embodiments described above, a shielding member (for example, electric wire shielding member 3) is configured to be attached to a shielding shell (2) by a fastening member (8). The shielding member includes a first plate portion (21) provided with an electric wire insertion port (25) protruding in a first direction and a second plate portion (22) formed by bending an end portion of the first plate portion (21) toward a second direction opposite to the first direction. The second plate portion (22) includes a first end and a second end along an intersecting direction intersecting the first and second directions, a fastening hole (24) provided at each of the first and second ends and through which the fastening member (8) is configured to be inserted and a protruding portion (23) provided on the first end and protruding toward the first direction. The second plate portion (22) is configured such that the first and second ends deviate from each other in a plate thickness direction of the second plate portion. A length (L2) of the protruding portion (23) along the first and second directions is longer than a length (L1) of the second plate portion along the first and second directions.

A shielding member having a configuration explained above will be described below. The shielding member having the configuration includes a first plate portion provided with an electric wire insertion port protruding in a predetermined direction, and a second plate portion formed by bending an end portion of the first plate portion toward a side opposite to a protruding side of the electric wire insertion port in the predetermined direction. The second plate portion is provided with fastening holes at both end portions in an intersecting direction, and is configured such that one end and the other end in the intersecting direction are offset from each other in a plate thickness direction of the second plate portion. Accordingly, for example, when a plurality of shielding members are attached to the shielding shell, one end of one shielding member can be overlapped with the other end of the other shielding member adjacent to the one shielding member, and an increase in the size of the shielding member and the shielding shell in the plate thickness direction can be prevented. Further, in the shielding member having the configuration, the second plate portion has a protruding portion on one end side in the intersecting direction that protrudes to the same side as the protruding side of the electric wire insertion port in the predetermined direction, and a length of the protruding portion in the predetermined direction is longer than a length of the second plate portion in the predetermined direction. That is, when a plurality of shielding members are attached to the shielding shell, one end having the protruding portion in the intersecting direction is overlapped with the other end of the adjacent shielding member so that the one end is located on the outside. For example, when the one end is overlapped with the other end of the adjacent shielding member so that the one end is located on the inside, the protruding portion interferes with the first plate portion of the adjacent shielding member. In this way, the shielding member having the configuration can prevent erroneous assembly to the shielding shell.

A shielded connector (1) may include the shielding member (electric wire shielding member 3) and a shielding shell (2) to which a plurality of the shielding members are configured to be attached. The first end of the second plate portion (22) of a first shielding member of the plurality of shielding members may be configured to be overlapped with an outer side of the second end of the second plate portion (22) of a second shielding member of the plurality of shielding members, the second shielding member being adjacent to the first shielding member. When the first end of the first shielding member is overlapped with an inner side of the second end of the second shielding member, the protruding portion (23) of the first shielding member may interfere with the first plate portion (21) of the second shielding member.

With this configuration, the shielded connector includes the shielding member as explained above and a shielding shell to which a plurality of shielding members are attached. The shielded connector is configured such that one end of the second plate portion of one shielding member is overlapped with the other end of the second plate portion of the other shielding member on the outside. That is, in this case, the fastening member can be inserted through fastening holes of both the one shielding member and the other shielding member. Further, the shielded connector is configured such that, when the one end of the second plate portion of the one shielding member is overlapped with the other end of the second plate portion of the other shielding member on the inside, the protruding portion of the one shielding member interferes with the first plate portion of the other shielding member. That is, in this case, the fastening member cannot be inserted through a fastening hole on one end side of the one shielding member and a fastening hole on the other end of the other shielding member. In this way, in the shielded connector having the configuration, when the shielding member is erroneously attached to the shielding shell, the protruding portion interferes with the first plate portion of the adjacent shielding member, and thus it is possible to prevent erroneous assembly of the shielding member to the shielding shell.

The shielded connector (1) may further include an electric wire (for example, terminal-equipped electric wire 6) configured to be inserted through the electric wire insertion port (25), an outer periphery of the electric wire (6) being covered with a braid (5). The shielding shell (2) and the braid (5) may be configured to be conductively connected with each other via the shielding member (electric wire shielding member 3).

With this configuration, the shielded connector further includes an electric wire that is inserted through an electric wire insertion port and whose outer periphery is covered with a braid, and a shielding shell and the braid are conductively connected via a shielding member. That is, the shielding shell and the braid can be easily conductively connected by assembling the shielding member to the shielding shell.

What is claimed is:

1. A shielding member configured to be attached to a shielding shell by a fastening member, the shielding member comprising:

a first plate portion provided with an electric wire insertion port protruding in a first direction; and a second plate portion formed by bending an end portion of the first plate portion toward a second direction opposite to the first direction, wherein the second plate portion includes:

a first end and a second end along an intersecting direction intersecting the first and second directions, a fastening hole provided at each of the first and second ends and through which the fastening member is configured to be inserted; and a protruding portion provided on the first end and protruding toward the first direction, wherein the second plate portion is configured such that the first and second ends deviate from each other in a plate thickness direction of the second plate portion, and wherein a length of the protruding portion along the first and second directions is longer than a length of the second plate portion along the first and second directions.

2. A shielded connector including the shielding member according to claim 1 and a shielding shell to which a plurality of the shielding members are configured to be attached, wherein the first end of the second plate portion of a first shielding member of the plurality of shielding members is configured to be overlapped with an outer side of the second end of the second plate portion of a second shielding member of the plurality of shielding members, the second shielding member being adjacent to the first shielding member, and wherein, when the first end of the first shielding member is overlapped with an inner side of the second end of the second shielding member, the protruding portion of the first shielding member interferes with the first plate portion of the second shielding member.

3. The shielded connector according to claim 2, further comprising:

an electric wire configured to be inserted through the electric wire insertion port, an outer periphery of the electric wire being covered with a braid, wherein the shielding shell and the braid are configured to be conductively connected with each other via the shielding member.

* * * * *